US006995966B2

(12) United States Patent
Zansky et al.

(10) Patent No.: US 6,995,966 B2
(45) Date of Patent: Feb. 7, 2006

(54) FIRE PROTECTION FOR ELECTRONICS EQUIPMENT

(75) Inventors: Zoltan Zansky, San Carlos, CA (US); Joseph Tupy, Mountain View, CA (US)

(73) Assignee: Network Appliance, Inc., Sunnyvale, CA (US)

(*) Notice: Subject to any disclaimer, the term of this patent is extended or adjusted under 35 U.S.C. 154(b) by 433 days.

(21) Appl. No.: 10/314,553

(22) Filed: Dec. 9, 2002

(65) Prior Publication Data

US 2004/0109415 A1 Jun. 10, 2004

(51) Int. Cl.
*H02H 5/04* (2006.01)

(52) U.S. Cl. ........................................ 361/103

(58) Field of Classification Search ................. 361/103
See application file for complete search history.

(56) References Cited

U.S. PATENT DOCUMENTS 3,665,440 A * 5/1972 McMenamin ............... 340/578
4,223,305 A * 9/1980 Arima ........................ 340/629
4,319,229 A * 3/1982 Kirkor ........................ 340/521
4,750,142 A * 6/1988 Akiba et al. ................ 340/578
4,797,664 A * 1/1989 Kimura .................. 340/693.3
4,994,672 A * 2/1991 Cross et al. ................ 250/330
5,602,394 A * 2/1997 Dombrowski et al. . 250/339.02
5,640,141 A * 6/1997 Myllymaki ................. 340/506
5,821,535 A * 10/1998 Dombrowski et al. . 250/339.02
6,696,958 B2 * 2/2004 Anderson .................. 340/578
6,717,228 B2 * 4/2004 Ando et al. ................. 257/443
6,770,882 B2 * 8/2004 Carr et al. ............... 250/338.1
6,861,633 B2 * 3/2005 Osborn .................... 250/208.1

* cited by examiner

*Primary Examiner*—Stephen W. Jackson
*Assistant Examiner*—James A. Demakis
(74) *Attorney, Agent, or Firm*—Suiter West Swantz PC LLO

(57) ABSTRACT

A method and apparatus for fire prevention in electronic equipment utilizes infrared imaging technology to monitor a substantial region of an enclosure within the electronic equipment. For example, a shelf within a computer cabinet may have a lens and thermal sensor array placed within to detect changes in temperature. A processor interprets the data from the thermal sensor array to determine whether to send an alert to an operator and/or to shut down a power supply.

33 Claims, 6 Drawing Sheets

FIRE PROTECTION FOR ELECTRONICS EQUIPMENT

FIELD OF THE INVENTION

The present invention generally relates to the field of safeguarding electronic equipment, and particularly to a method and apparatus for identifying thermal hot spots within an electronic equipment enclosure and taking corrective action.

BACKGROUND OF THE INVENTION

Presently, high power electronic equipment, especially over 200 W, is susceptible to fire damage caused by electrical shorts. Shorts occur across low voltage power planes and ground on the printed circuit cards within the computer cabinet and cause high currents to ignite the printed circuit boards. It has been observed that the electrical short circuits start as a localized hot spot before burning. Because the localized burning is not self-extinguishing, a fire may cause extensive damage to expensive equipment accompanied by a lengthy down time.

Therefore, it would be desirable to provide a system and a method for identifying hot spots within electronic equipment.

SUMMARY OF THE INVENTION

Accordingly, the present invention is directed to a method and a system for identifying hot spots within electronic equipment.

In a first aspect of the present invention, an apparatus for preventing fires in electronic equipment includes a radiation-collecting element for collecting infrared radiation generated within an enclosure of the electronic equipment. A sensor array is coupled to the radiation-collecting element for detecting intensity of the infrared radiation within the enclosure. The sensor array is formed of a plurality of pixels. Each of the pixels provides an electrical value (i.e., a voltage or a current) that is commensurate with the intensity of the infrared radiation received by the pixel. A signal processor detects changes in the intensity of the infrared radiation received by each pixel. A controller interprets the changes in the intensity of the infrared radiation received by each of the plurality of pixels and takes an action such as issuing an alert or shutting down power. A variant of the apparatus of the present invention includes the use of a single thermal sensor. Other variations include using a single lens, a lens array, a focusing mirror, or optical fibers with or without lenses.

In a second aspect of the present invention, a method for preventing fires in electronic equipment includes collecting spatially arranged infrared radiation from within an enclosure of the electronic equipment. A voltage or current is measured from each pixel of a sensor array. The electrical characteristic is processed to determine environmental changes in an enclosure of the electronic equipment. An action is performed as a result of the determination of environmental changes within the enclosure.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
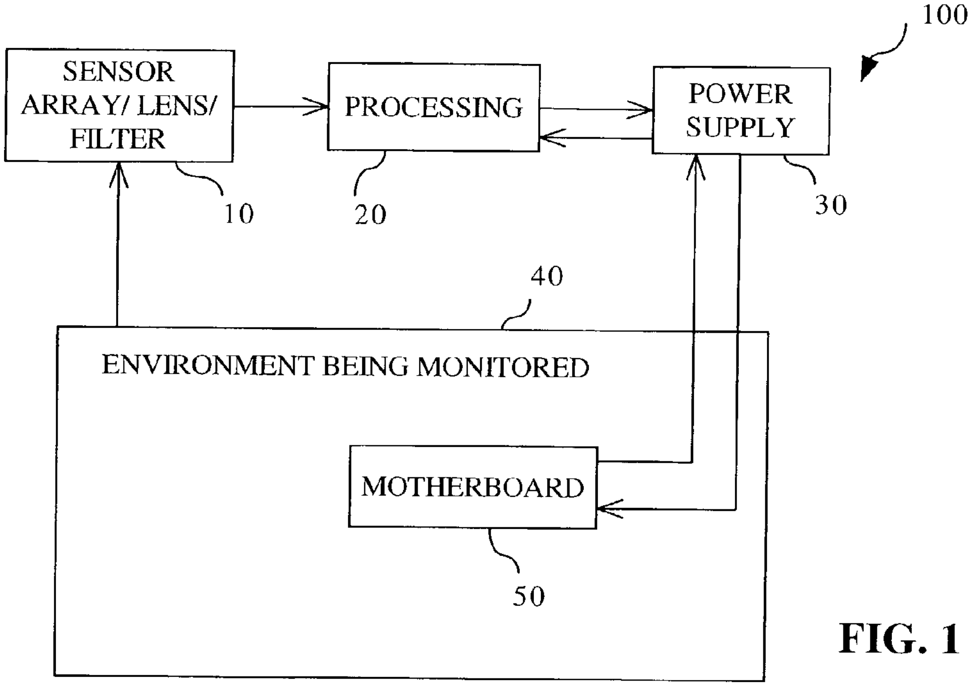
FIG. 1 illustrates a functional block diagram of a preferred embodiment of an apparatus of the present invention.

FIG. 1 illustrates a preferred embodiment 100 of the present invention. A volume 40, preferably an enclosed volume, is continually being measured by a radiation collecting system 10 for potentially detrimental changes in the physical environment. This enclosed volume may contain a heat-producing object, such as a shelf within an electronic equipment cabinet or rack, a motherboard, a printed circuit board, a collection of electronic boards, or the entire cabinet or rack. Examples of electronic equipment contained within the electronic equipment cabinet include servers, routers, hubs, network switches, mainframe electronics, radio frequency measurement equipment, storage devices, medical equipment, power supplies, and the like. The illustration of FIG. 1 depicts the heat-producing object in volume 40 as a motherboard 50. Preferably, the radiation collecting system 10 has a focusing element for directing radiation of a certain range of wavelengths onto a sensor array. A processor 20 then analyzes the detected radiation levels of each element of the sensor array A local sudden high temperature rise, progressive warming, or temperature exceeding a threshold is presumed to indicate a potentially dangerous condition. If a potentially dangerous condition is detected, the processor 20 may command the power supply 30 to shut off power to the electronic system, including the motherboard 50. The present invention may be implemented using an infrared sensor array with a fish-eye lens located at the top of the inside of an electronic cabinet. The fish eye lens projects the thermal image of the inside of the electronic equipment, including printed circuit board(s) to the array of thermal sensors. Alternatively, a single infrared sensor may be used to sense the thermal energy of the entire enclosure, shelf, or cabinet. A microprocessor continually monitors the sensor array. If one or more cells of the array indicate a sudden temperature rise exceeding a preprogrammed value, the microprocessor initiates a power supply shutdown before the temperature can cause a fire. Thus, the equipment is protected from a fire outbreak.

Figure 2:
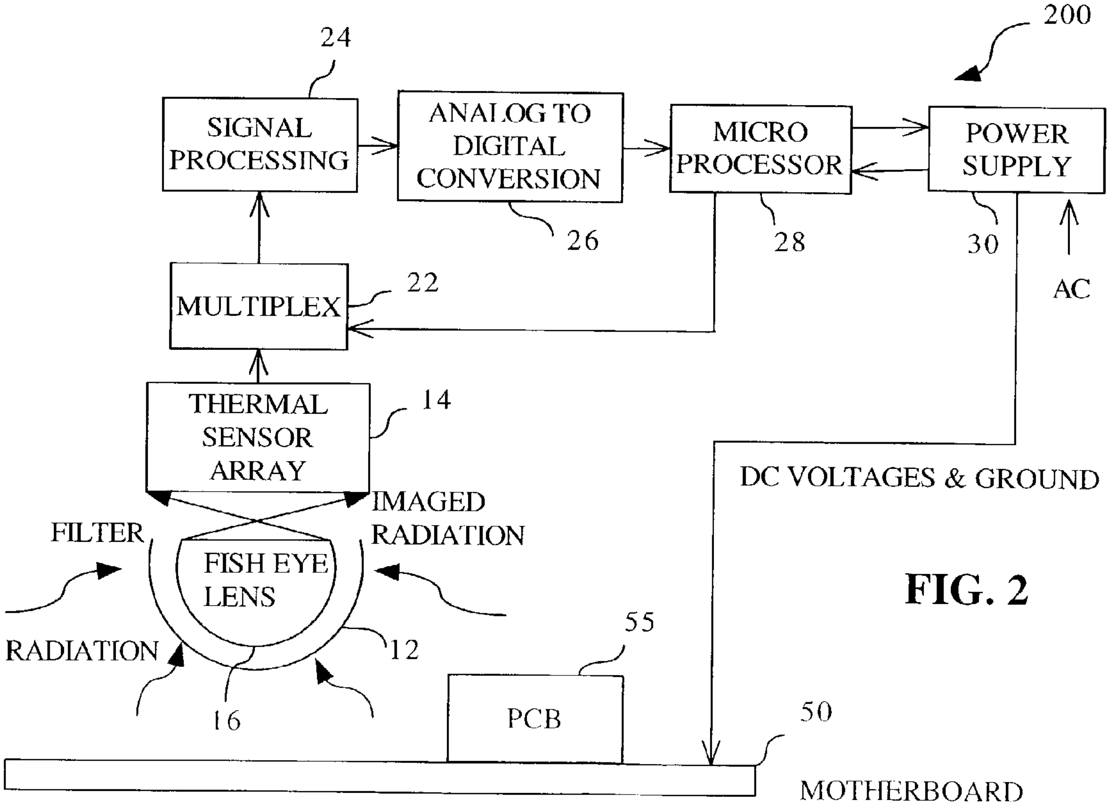
FIG. 2 illustrates an embodiment of an apparatus of the first invention.

FIG. 2 illustrates an embodiment of a system of the present invention. Radiation, especially thermal energy (i.e., infrared radiation), is being constantly emitted from the environment. The radiation may be passed through a notch filter 12 to isolate certain wavelengths, such as infrared radiation. Infrared radiation is especially useful because it is emitted by all objects above 0 degrees Kelvin (or −459.7 degrees Fahrenheit). Infrared radiation has a wavelength from 1 to 100 microns. The notch filter may pass all of or a portion of the infrared band. Limiting the passband to 1–5 or 1–10 microns in wavelength helps to sharpen the resolution of the detection system. The filter 12 is optional. If used, filter 12 may actually consist of several filter layers. Although filter 12 is shown as being shaped to conform to the shape of the lens 16, different configurations are contemplated by the present invention, including a planar filter element.

Lens 16 is preferably a wide-angle lens. Possible wide-angle lenses useable with this invention include fish eye lenses, panoramic annular lenses, doughnut lenses, and cat's eye lenses. The lens 16 focuses the radiation onto a sensor array 14, such as a thermal sensor array or thermopile array sensor. Multiple lenses, including lens arrays, may be used for redundancy and/or accuracy. Multiple individual sensors may also be used. Alternatively, another radiation collecting element such as an infrared mirror may be employed to focus and direct the radiation to the thermal sensor array. Infrared mirrors may be purchased at a low cost and lowers the overall cost of manufacturing the system additionally because the number of wires needed in the system are reduced. In the embodiment with an infrared mirror, the infrared mirror may be placed at the top of the enclosure to capture the radiation from the entire enclosure and the sensor array may be placed on the motherboard. Additionally, infrared mirrors may be employed with lenses to optimize the monitoring of potential hotspots. The radiation-collecting element may be placed at the top of the enclosed volume or as otherwise suitable, such as an enclosure wall. In an exemplary embodiment, a configuration of four individual sensors may have four lenses and four mirrors, each lens limited to focusing on ¼ of an enclosure or ¼ of a board being monitored. Other variations are envisioned by the present invention including using multiple lens and/or multiple mirrors per individual sensor or per individual pixel of a sensor array. Various optical elements may also be employed. For example, the background radiation may pass successively through an IR filter, a focusing lens, a collimator, and the sensor array. The use of a collimator would allow greater flexibility in the displacement between the lens and the sensor array.

The sensor array is preferably a two dimensional matrix of infrared radiation sensitive pixels that produce a voltage corresponding to the intensity of the radiation illuminating each individual pixel. The pixel data is sampled at a periodic rate through a multiplexer 22. A signal processor analyzes the pixel data to detect hazardous conditions that have been sensed. This may be achieved through comparing individual pixel voltages against their individual preset voltages or simply against a standard voltage threshold. The pixels may also be monitored to detect progressive warming or other changes to provide an alert to potential troublespots in the environment 40. The processed pixel data is converted from analog to digital form. Alternatively, the pixel data may be converted to a digital format before signal processing occurs.

A microprocessor 28 retrieves the processed data and determines through code whether to issue an alert or to shut down the power supply 30. The microprocessor processor 28 sets the sample rate from the sensor array, such as by controlling the multiplexer 22. The microprocessor 28 may be ported for remote monitoring or tracking of data in real-time or stored data. The power supply may also provide data to the microprocessor 28. The power supply 30 may receive alternating current or direct current input and convert the provided power to direct current voltages and ground for the circuitry 50, 55.

Figure 3:
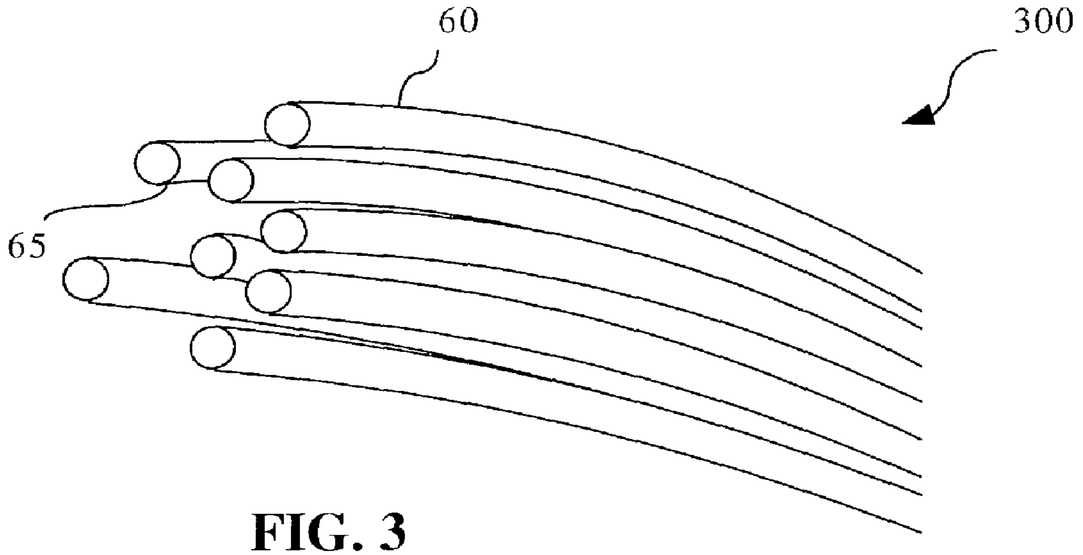
FIG. 3 illustrates a bundle of optical fibers of another embodiment of the present invention.
Figure 4:
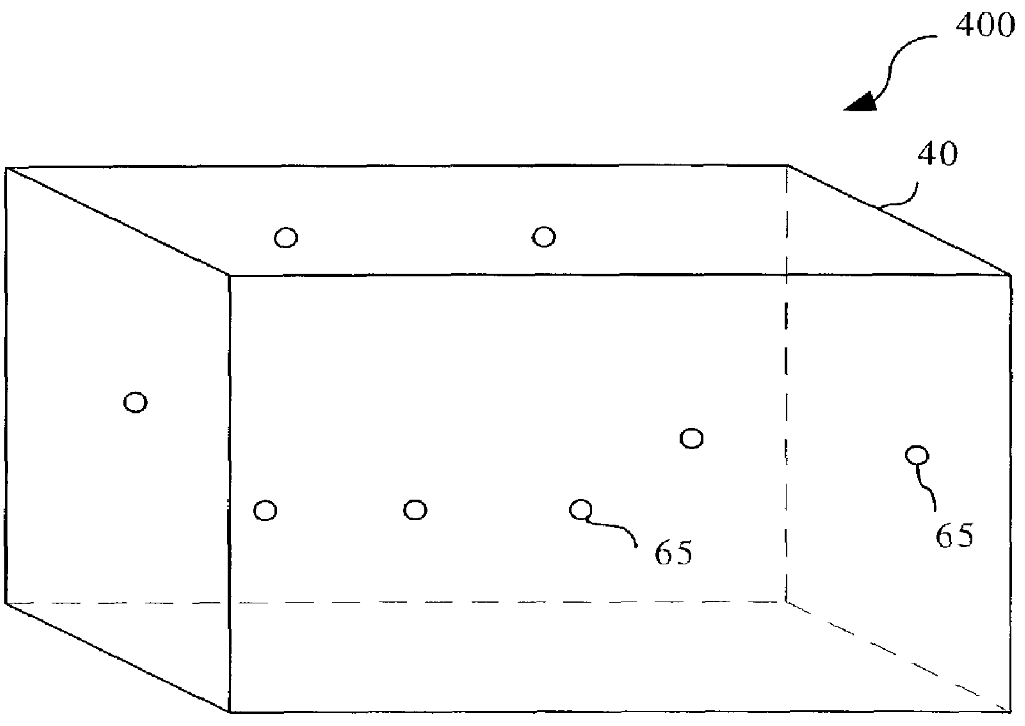
FIG. 4 illustrates placement of the ends of the optical fibers of FIG. 3 in an exemplary embodiment of the apparatus of the present invention.

FIGS. 3 and 4 illustrate another embodiment 300, 400 of the present invention. Optical fibers 60 may be placed to optimize detection of radiant energy conditions with the environment 40. The radiation receiving ends 65 of the individual optical fibers 60 may include filters and/or lenses and/or may be shaped so as to capture a wide angle of radiant energy. The opposite ends of the individual optical fibers may be placed in proximity to the sensor array, preferably in a one-to-one correspondence between sensor array element or pixel and an individual optical fiber. A separate lens or separate multiple lenses may be provided for all or a portion of the radiation receiving ends 65 of the individual optical fibers to collect a wider angle of radiation. Alternatively, the radiation receiving ends 65 may be flat and smooth to narrow the angle of radiation collected so as to carefully monitor the thermal characteristics of a defined region. FIG. 4 shows the location of optical fiber ends 65 within an environment to be monitored. An advantage to optical fibers is the ability to place them around obstructions or shadow spots such as air baffles and standing boards.

Figure 5:
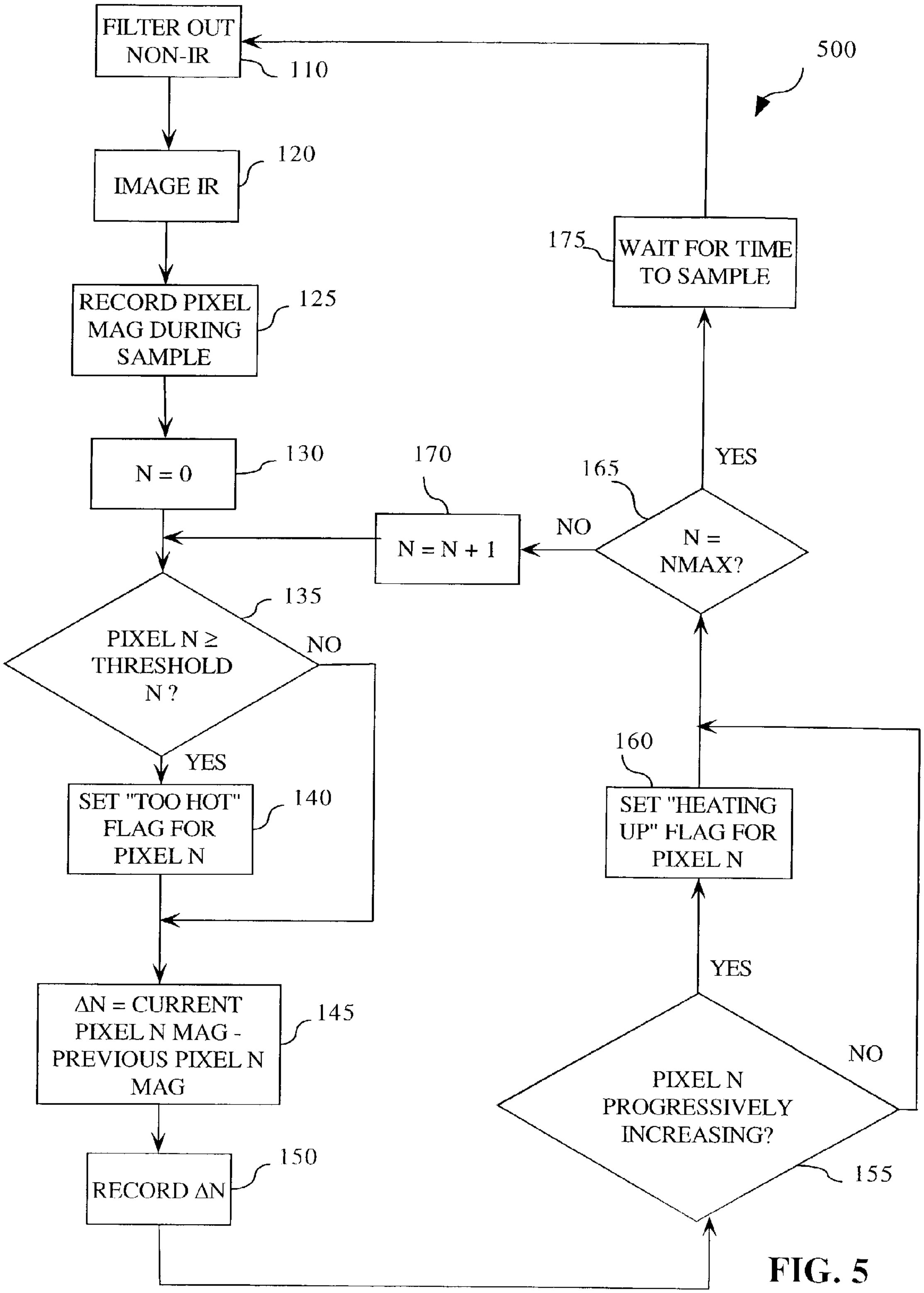
FIG. 5 illustrates an embodiment of a method of interpreting the thermal sensor array data of the present invention.

FIG. 5 illustrates an embodiment of a method 500 of the present invention. Radiant energy is optionally filtered to remove non-infrared radiation 110. The infrared radiation is then collected, such as through a lens or lens system 120. The collected or focused infrared radiation falls onto a two-dimensional thermal sensor array, is sampled, and processed to determine a magnitude of the voltage. The magnitude of the pixel voltage is stored 125 in a memory, such as a first in, first out memory. The first pixel's voltage magnitude is processed to determine if the voltage magnitude exceeds a preset threshold for that pixel 135. The threshold may be preset at the factory and may be programmable by the user. If the threshold is exceeded, then a flag, such as a "too hot" flag, is set. Further processing may include determining the amount or rate of change in the voltage readout magnitude between samples 145 and recording of this value in memory 150. A history of the pixel changes may be used to determine if a region of the environment corresponding to the pixel is progressively warming up or otherwise changing 155. If such a determination is made, a "heating up" flag may be set 160. If the last pixel has been processed, the process may repeat after a sufficient passage of time 175. This wait period may occur through a synchronizing means, such as a circuit or code. Otherwise, the next pixel data is processed 170. Variations of the present method are contemplated such as providing an address of the pixel and only reporting pixels that have actually experienced a significant change or that have exceeded a threshold.

Figure 6:
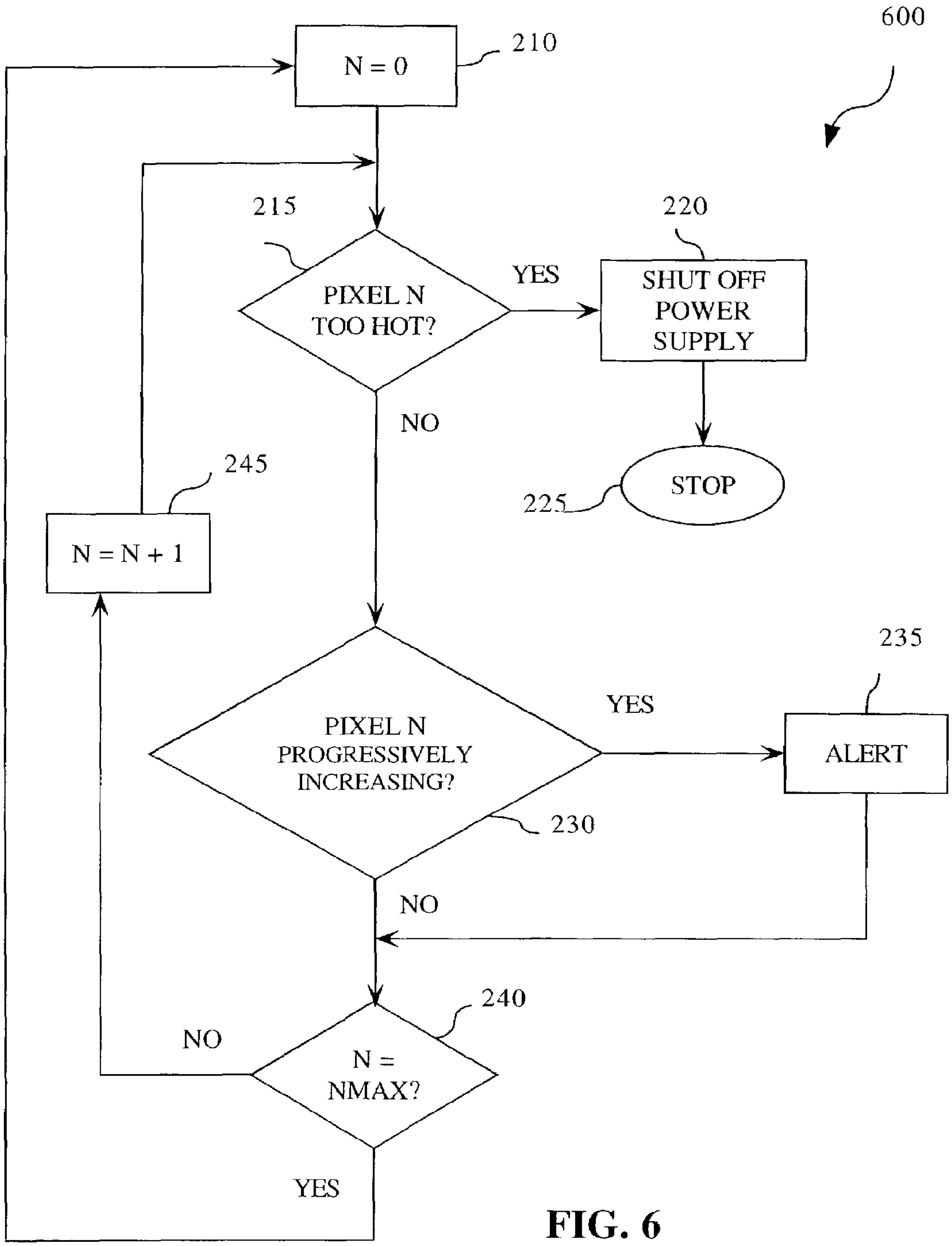
FIG. 6 illustrates an embodiment of a method of using the results of the interpretation of the thermal sensor array data.

FIG. 6 illustrates an embodiment of a method for using the "too hot" and "heating up" flags. Pixel data may be successively accessed 210, 240, 245. If the pixel is determined to represent a too hot region 215, the power supply is cut off 220, 225. Otherwise, if the pixel is becoming warmer 230, an alert may be issued 235. This alert may be a signal to another process and/or may involve the activation of an indicator, such as a light emitting diode. A remote operator may be informed of an alert condition as well as a power shut off condition and be provided with information concerning the status of the system. A graphical representation of conditions of the environment, including a temperature profile, over time may be displayed.

Figure 7:
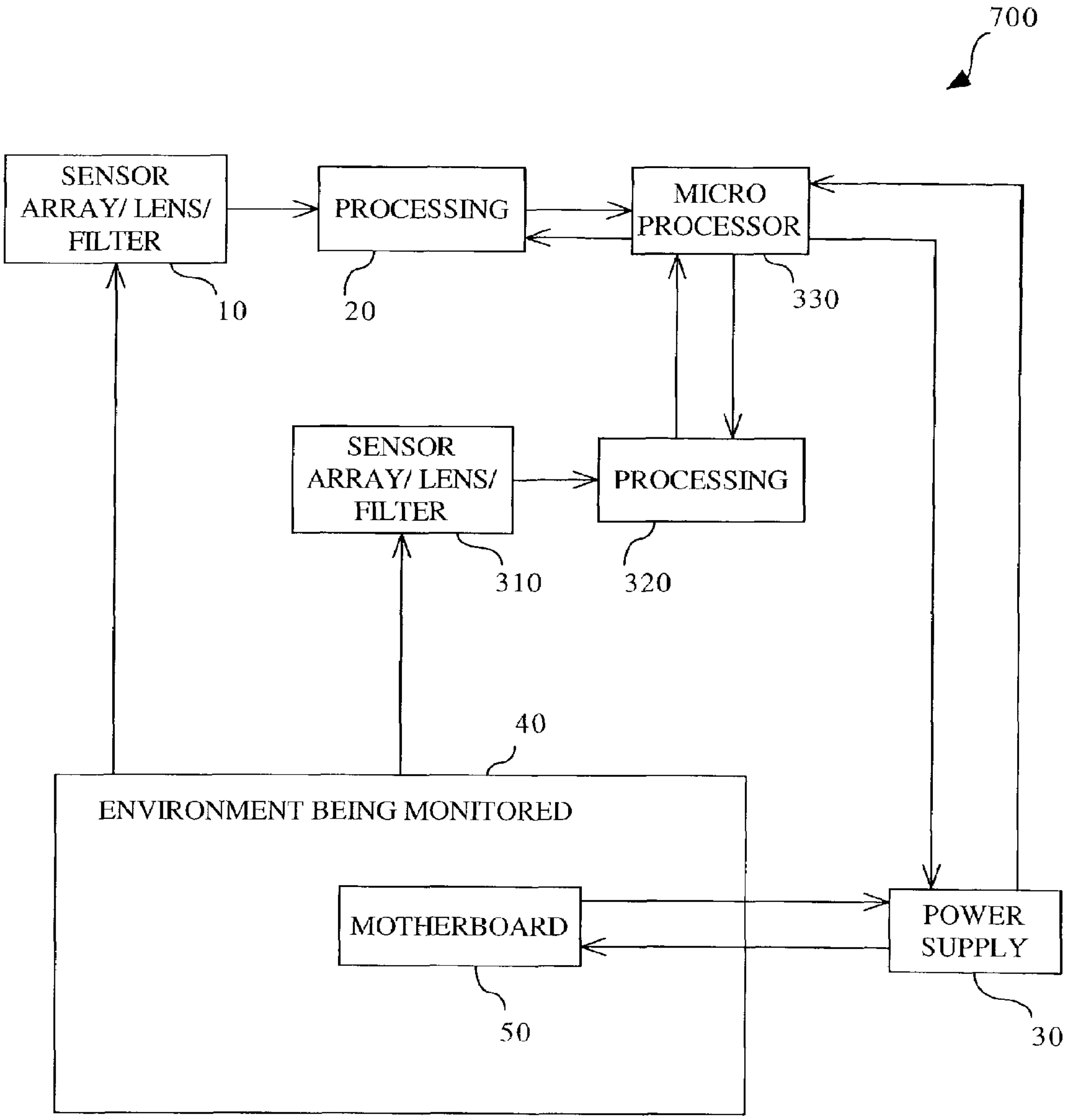
FIG. 7 illustrates a block diagram of a redundant system employing the apparatus of the present invention.

FIG. 7 illustrates an embodiment of the present invention employing redundancy. Two radiation collecting systems 10, 310 may concurrently monitor the conditions of an environment 40. Alternatively, one radiation collecting system may serve as a backup for the other. Preferably, the radiation collecting systems 10, 310 operate in parallel. Each system may have a corresponding signal processor 20, 320 or may share a signal processor. A microprocessor 330 may control both processors 20, 320 and determine the reporting of alerts or automatically shutting down a power supply 30.

Figure 8:
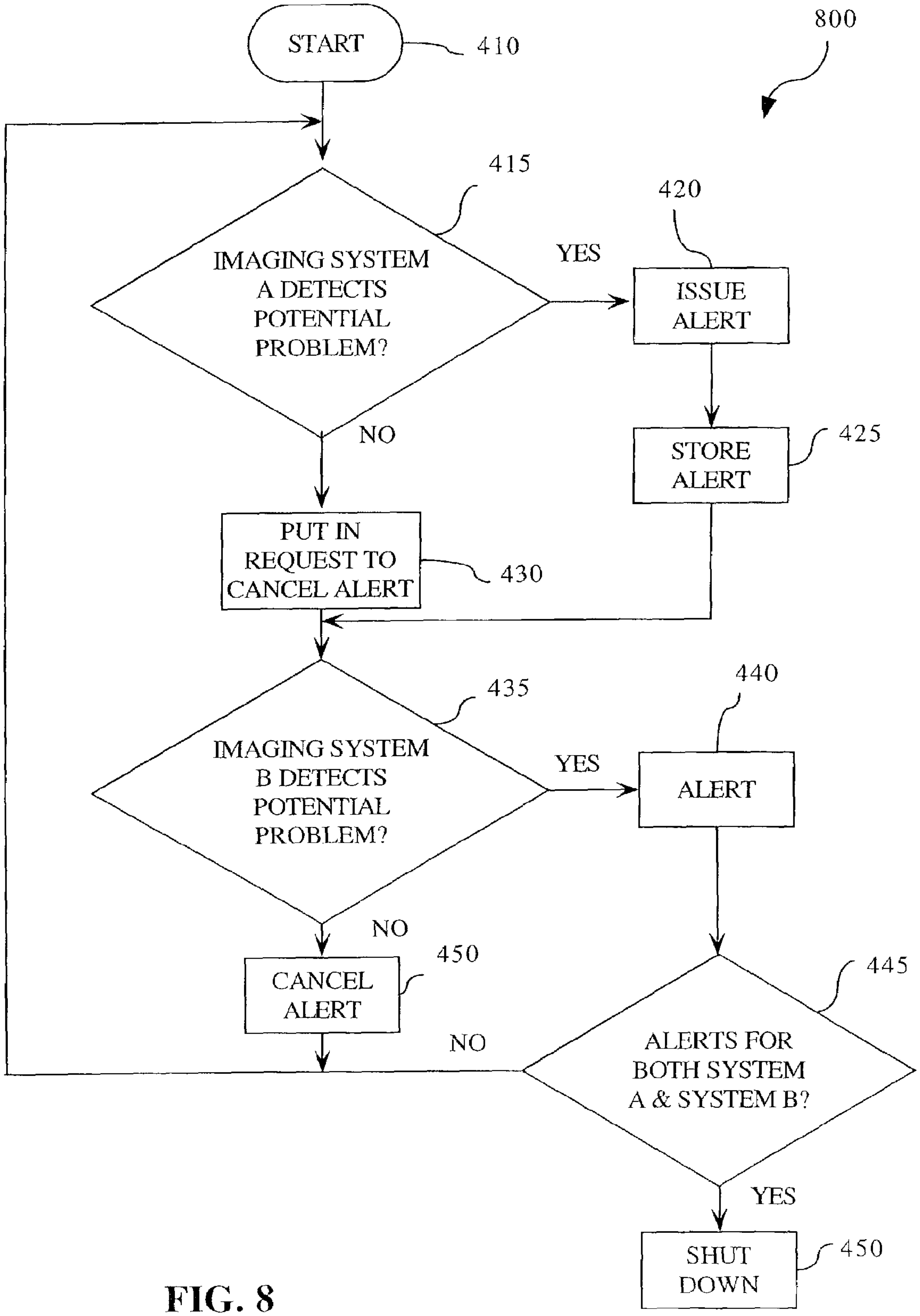
FIG. 8 illustrates a method for processing data from multiple apparatuses in the present invention.

FIG. 8 illustrates an embodiment of a method using the system of FIG. 7. If a first radiation collecting system determines a potential problem 415, an alert may be issued 420 and stored 425. A request may automatically be made to cancel the alert. If the second system also determines a potential problem 435, a second alert may be issued 440. If both radiation-collecting systems have issued alerts 445, the power supply may be shut down 450. Otherwise, processing continues 415. If both radiation-collecting systems no longer determine a potential problem, the alert may be canceled 450.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An apparatus for preventing fires in electronic equipment, comprising:

a radiation-collecting element for collecting infrared radiation within an enclosure of the electronic equipment, the radiation-collecting element including an optical fiber;

a sensor array coupled to the radiation-collecting element for detecting intensity of the infrared radiation within the enclosure, the sensor array being formed of a plurality of pixels, each of the plurality of pixels providing an electrical value that is commensurate with the intensity of the infrared radiation received by the pixel;

a signal processor for detecting changes in the intensity of the infrared radiation received by each of the plurality of pixels through the electrical value of the pixel; and a controller for interpreting the changes in the intensity of the infrared radiation received by each of the plurality of pixels and for taking an action if a condition occurs based upon the interpreting the changes in the intensity of the infrared radiation received by each of the plurality of pixels.

2. The apparatus of claim 1, further comprising a filter for passing only infrared radiation to the radiation-collecting element.

3. The apparatus of claim 1, wherein the radiation-collecting element further includes a wide-angle lens.

4. The apparatus of claim 3, wherein the wide-angle lens is a fish eye lens.

5. The apparatus of claim 3, wherein the wide-angle lens is a doughnut shaped lens.

6. The apparatus of claim 3, wherein the wide-angle lens is a panoramic annular lens.

7. The apparatus of claim 1, wherein the optical fiber receives the infrared radiation through an end of the optical fiber.

8. The apparatus of claim 7, wherein the end of the optical fiber has a filter.

9. The apparatus of claim 7, wherein the end of the optical fiber is curved.

10. The apparatus of claim 7, wherein the end of the optical fiber is smooth and flat.

11. The apparatus of claim 7, further comprising a lens for directing the infrared radiation into the end of the optical fiber.

12. The apparatus of claim 7, further comprising multiple lenses for directing the infrared radiation into the end of the optical fiber.

13. The apparatus of claim 7, further comprising a mirror for directing the infrared radiation into the end of the optical fiber.

14. The apparatus of claim 1, wherein the signal processor digitizes the electrical value of the pixel before detecting changes in the electrical value.

15. The apparatus of claim 1, wherein the signal processor detects changes in the electrical value of the pixel before digitizing.

16. The apparatus of claim 1, further comprising an analog to digital converter between the signal processor and the controller.

17. The apparatus of claim 1, wherein the controller is a microprocessor.

18. The apparatus of claim 17, wherein the controller receives data from and transmits data to a power supply.

19. A method for preventing fires in electronic equipment, comprising:

collecting infrared radiation from within an enclosure of the electronic equipment, wherein the collecting is performed through optical fibers;

sampling an electrical characteristic from a sensor array upon which the collected infrared radiation falls;

processing the electrical characteristic to determine environmental changes in enclosure of the electronic equipment; and performing an action as a result of the determination of environmental changes within the enclosure.

20. The method of claim 19, further comprising filtering out radiation that is not infrared radiation before collecting.

21. The method of claim 20, wherein the collecting is performed through the optical fibers and a lens.

22. The method of claim 20, wherein the collecting is performed through a wide-angle lens.

23. The method of claim 20, wherein the sensor array is a two-dimensional thermal sensor array.

24. The method of claim 20, wherein the electrical characteristic is a voltage.

25. The method of claim 20, wherein the electrical characteristic is a current.

26. The method of claim 20, wherein the processing includes comparing a magnitude of the electrical characteristic with a threshold.

27. The method of claim 20, wherein the processing includes calculating a change in magnitude of the electrical characteristic between samples.

28. The method of claim 27, wherein the changes in magnitude of the electrical characteristic are stored.

29. The method of claim 28, further comprising issuing an alert if the stored changes progressively increase.

30. The method of claim 20, wherein the processing includes analog to digital conversion on a front end of the processing.

31. The method of claim 20, wherein the processing includes analog to digital conversion on a back end of the processing.

32. The method of claim 20, wherein collecting infrared radiation is through the optical fiber and an infrared mirror.

33. A method for preventing fires in electronic equipment, comprising:

collecting infrared radiation from within an enclosure of the electronic equipment, wherein the collecting is performed through a concave infrared mirror;

sampling an electrical characteristic from a sensor array upon which the collected infrared radiation falls;

processing the electrical characteristic to determine environmental changes in enclosure of the electronic equipment; and performing an action as a result of the determination of environmental changes within the enclosure.

* * * * *